US008393044B2

(12) United States Patent
Favagrossa

(10) Patent No.: US 8,393,044 B2
(45) Date of Patent: Mar. 12, 2013

(54) ROTARY BRUSH FOR MOTOR VEHICLE WASHING SYSTEMS

(75) Inventor: Francesco Favagrossa, Sabbioneta (IT)

(73) Assignee: Favagrossa Edoardo S.R.L., Cremona (IT)

( * ) Notice: Subject to any disclaimer, the term of this patent is extended or adjusted under 35 U.S.C. 154(b) by 1276 days.

(21) Appl. No.: 12/086,655

(22) PCT Filed: May 4, 2006

(86) PCT No.: PCT/IT2006/000310
§ 371 (c)(1),
(2), (4) Date: Jun. 13, 2008

(87) PCT Pub. No.: WO2007/072524
PCT Pub. Date: Jun. 28, 2007

(65) Prior Publication Data
US 2009/0255072 A1    Oct. 15, 2009

(30) Foreign Application Priority Data

Dec. 22, 2005   (IT) .............................. MI2005A2467

(51) Int. Cl.
*B60S 3/06* (2006.01)
(52) U.S. Cl. .................. 15/230.19; 15/230.16; 15/53.2; 15/53.3
(58) Field of Classification Search ............ 15/53.2, 15/97.3, 179, 230.1, 183, 53.1, 53.3, 230.16, 15/230.19, 230.13; 451/466; *A46B 13/00*
See application file for complete search history.

(56) References Cited

U.S. PATENT DOCUMENTS

| 1,996,544 | A | * | 4/1935 | Justice ............................ 15/183 |
| 2,015,171 | A | * | 9/1935 | White ............................. 15/183 |
| 2,767,418 | A | * | 10/1956 | Lombardi ....................... 15/183 |
| 2,921,329 | A | * | 1/1960 | Peterson ........................ 15/182 |
| 3,241,172 | A | * | 3/1966 | Tilgner .......................... 15/183 |
| 3,324,496 | A | * | 6/1967 | Haracz .......................... 15/183 |
| 3,715,773 | A | * | 2/1973 | Drumm ......................... 15/183 |
| 4,018,014 | A | * | 4/1977 | Belanger ....................... 451/469 |
| 4,104,756 | A | * | 8/1978 | Gasser et al. ................. 15/97.3 |
| 4,183,183 | A | * | 1/1980 | Belanger ....................... 451/469 |
| 4,194,260 | A | * | 3/1980 | Culp .......................... 15/230.14 |
| 4,338,698 | A | * | 7/1982 | Beer et al. ................. 15/230.16 |
| 4,567,619 | A | * | 2/1986 | Clark ............................ 15/97.3 |
| 4,707,875 | A | * | 11/1987 | Wachter ........................ 15/179 |
| 4,907,378 | A | * | 3/1990 | Huppert ........................ 451/463 |
| 5,045,091 | A | * | 9/1991 | Abrahamson et al. ......... 51/293 |
| 5,093,951 | A | * | 3/1992 | Smith et al. .................... 15/53.2 |
| 5,134,742 | A | * | 8/1992 | Ennis ............................. 15/53.1 |
| 5,222,273 | A | * | 6/1993 | Favagrossa .................... 15/181 |
| 5,251,355 | A | * | 10/1993 | Drumm ......................... 15/182 |

(Continued)

FOREIGN PATENT DOCUMENTS

DE       203 12 415 U1    12/2004
WO      WO2004/052703 A1    6/2004

OTHER PUBLICATIONS

PCT Search Report dated Aug. 30, 2006.

*Primary Examiner* — Joseph J Hail
*Assistant Examiner* — Joel Crandall
(74) *Attorney, Agent, or Firm* — Hedman & Costigan, P.C.

(57) ABSTRACT

A helical rotary brush for motor vehicle washing systems comprising a plurality of strips coupled to a central support element, through restrained joint coupling means, comprising slots designed for receiving suitably contoured bar elements, said slots being arranged with an helical arrangement on the central support element.

7 Claims, 15 Drawing Sheets

U.S. PATENT DOCUMENTS

| | | | | |
|---|---|---|---|---|
| 5,396,680 A | * | 3/1995 | Belanger | 15/230.16 |
| 5,445,438 A | * | 8/1995 | Drumm | 300/21 |
| 5,490,301 A | * | 2/1996 | Droeser et al. | 15/183 |
| 5,623,741 A | * | 4/1997 | Clark | 15/230.16 |
| 5,819,357 A | * | 10/1998 | Gould | 15/182 |
| 5,933,907 A | * | 8/1999 | Drumm | 15/183 |
| 5,946,761 A | * | 9/1999 | Ennis | 15/230.16 |
| 6,279,190 B1 | * | 8/2001 | Belanger et al. | 15/230.16 |
| 6,289,544 B1 | * | 9/2001 | Kirikian | 15/97.3 |
| 6,564,418 B1 | * | 5/2003 | Favagrossa | 15/230.16 |
| 6,592,442 B2 | * | 7/2003 | Hoffheimer | 451/466 |
| 7,805,798 B2 | * | 10/2010 | Belanger | 15/230.16 |
| 2003/0172479 A1 | * | 9/2003 | Ennis et al. | 15/97.3 |

* cited by examiner

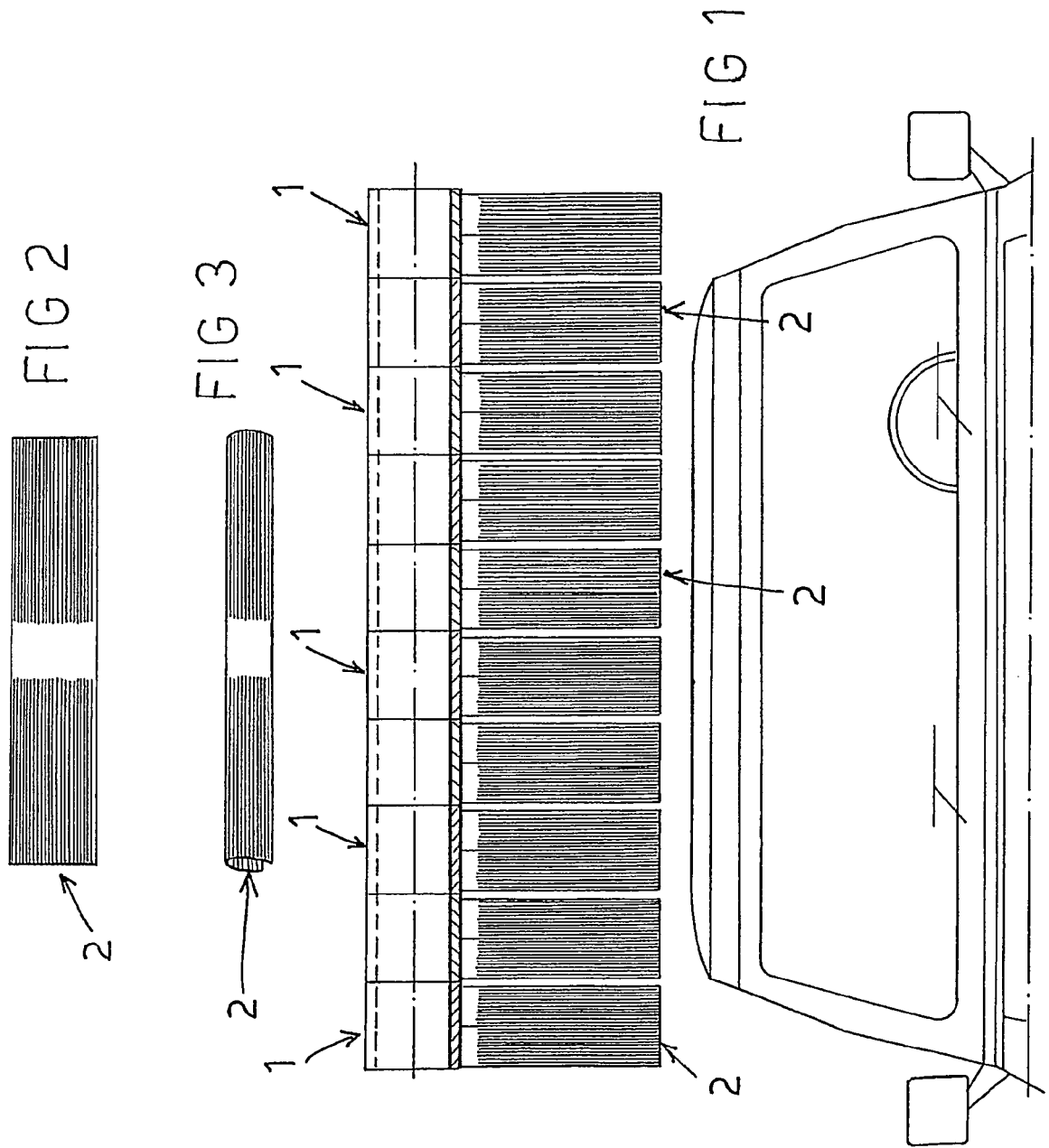

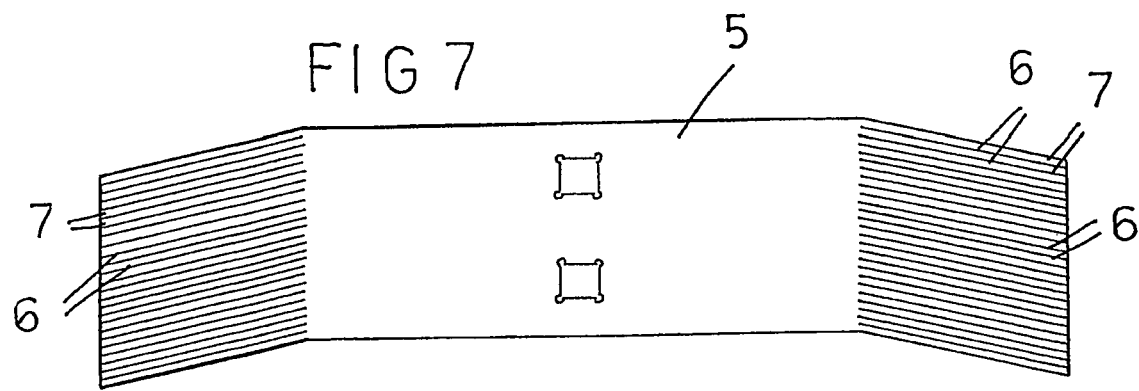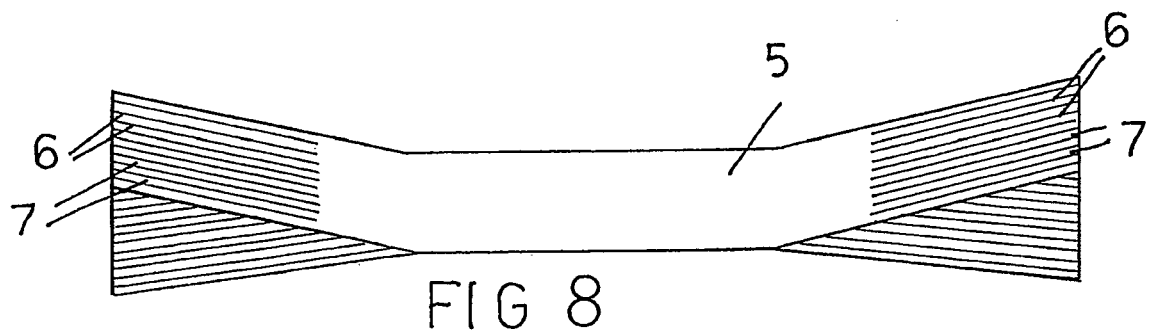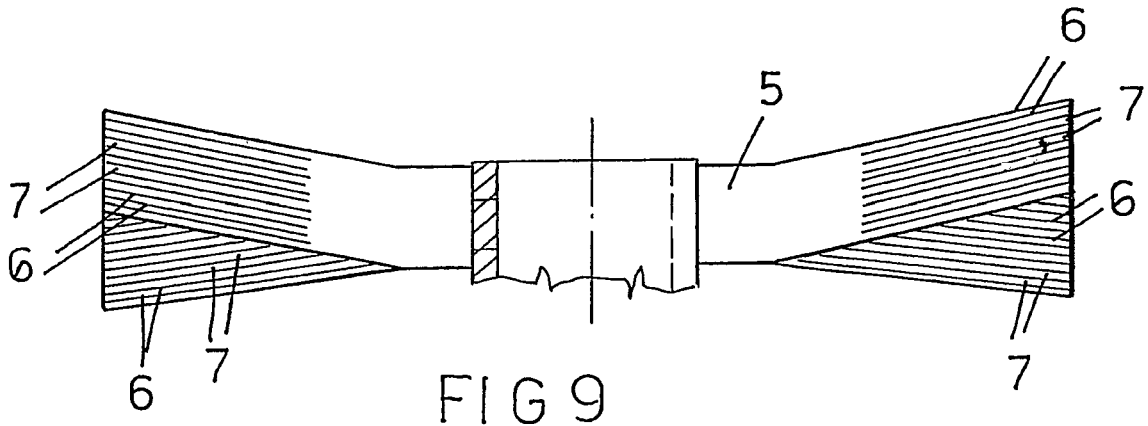

ROTARY BRUSH FOR MOTOR VEHICLE WASHING SYSTEMS

BACKGROUND OF THE INVENTION

The present invention relates to a rotary brush specifically designed for motor vehicle washing systems.

As is known, automatic motor vehicle washing systems conventionally comprise washing brush elements.

Prior rotary brush elements generally comprise a support, of cylindric configuration, and coupled to a rotary member.

On the outer surface of the support element are applied a plurality of flexible cleaning elements, adjoining one another and coupling, at an end portion, to said support element, orthogonally thereto.

The automatic cleaning and washing of the motor vehicle body are achieved by causing a plurality of brushes of the above disclosed type to properly rotate, to cause their flexible elements, held in a preset configuration under the effect of the centrifugal force generated by the rotary brushes, to impact the motor vehicle body, through the interposition of water and/or suitable washing solutions or emulsions.

The above mentioned prior cleaning elements, in particular, are at present made of a polyethylene material, in the form of wires, or they comprise felt materials, in the form of strips or bands.

In the first case, the free end portion of each brush forming wire is crushed, with a specifically designed method called "feathering", to increase the width of each said wire, to distribute its impact pressure on a larger surface, while increasing the cleaning surface.

On this end portion which, after the above mentioned treatment, as a set rough and porosity, minute particles, either of stone or metal nature, are deposited, said particles being collected from the previously cleaned surfaces.

The removed particles enter the mentioned rough and porous parts, to be crusted therein, thereby forming abrading regions which can scratch the paint of the motor vehicle being washed, and generate minute scorings thereon.

This same drawback also occurs, in a further enhanced manner, if felt elements are used, which felt material, of spongy nature, is susceptible easily embed the abrading particles therein.

Moreover, with felt cleaning elements, since the felt materials have a great liquid absorption properties, a further drawback occurs that, at a temperature near to zero, and because of a cooling effect caused by the evaporation generated by the washing brush movement, the elements tend to fully or partially freeze, thereby stiffening and preventing the washing system from properly operating.

The washing brush elements made of band elements, comprise a plurality of strips or strings, which are formed by partially cutting through the band elements.

Said strips are arranged perpendicularly to the axis of the entraining shaft, thereby said bands are restrained.

This constructional solution generates a series of problems.

In fact, to provide a suitable cleaning surface, it is necessary to perform the assembling of sectors or bristles supporting strips with a close arrangement, to prevent an uneven washing action from occurring.

In prior washing brushes, if the bristle supporting sectors or strips are spaced, in the spaced surface portions, the brush bristles will have gaps negatively affecting the cleaning of some regions of the motor vehicle body.

Moreover, if conventional band elements are arranged at a close spacing from one another, they provide undesired bridgings or overlappings of the strips, with a consequent possibility of an early wear of adjoining band strips.

Moreover, to provide even washing characteristics, it is necessary to mount on the supporting shaft a plurality of band supporting sectors or strips arranged in a close relationship and, to that end, it is necessary to use a supporting shaft of a suitable size to mechanically resist against the stress induced by the mentioned band elements.

Thus, because of the above mentioned over-sizing, the washing brushes will have a comparatively large weight, with a large increase of the consumed power, a greater wear of the rotary members and, accordingly, an increasing of the washing system faults.

Moreover, prior rotary brushes, including a plurality of close arranged bands, can damage the motor vehicle antenna and rear windows.

To the above it is to be added that the above mentioned band elements are frequently made of a foamed material and are affixed to the supporting shaft by several types of connecting means such as rivets, small bars and so on.

For technical reasons, the number of said band elements can vary from a minimum number to a number which is from one to three times larger and, as stated, the arrangement of the side surface of the shaft can be either too close or too spaced apart.

Then, as the thus designed washing brush is rotatively driven, the distribution of the strings cut through the band elements will mirror the arrangement of said band elements on the inner cylinder.

All the tradeoffs related to a lacking of space on the surface of the tube or supporting shaft are reflected mirror-like on the side surface of the thus formed cylindric brush.

However, as in regions of the washing brush is provided to use a minimum amount of band elements, the latter, which are affixed by conventional insert members, cannot be arranged with a rational arrangement on the washing cylinder.

SUMMARY OF THE INVENTION

Accordingly, the aim of the present invention is to provide such a rotary brush for motor vehicle washing systems overcoming the above mentioned drawbacks.

Within the scope of the above mentioned aim, a main object of the invention is to provide such a washing rotary brush to which the above mentioned string or band elements can be easily affixed and with a large mechanical strength.

Another object of the present invention is to provide such a washing rotary brush allowing to better exploit the cleaning strings, with respect to the intensity and covering of the washing operation.

Yet another object of the present invention is to provide such a washing rotary brush which has a variable geometry, depending on the brush diameter to be achieved.

According to one aspect of the present invention, the above mentioned aim and objects, as well as yet other objects, which will become more apparent hereinafter, are achieved by a washing rotary brush for motor vehicle washing systems, characterized in that said washing rotary brush comprises a plurality of band elements which are coupled to a central support member, through fixed-joint coupling means.

According to a further aspect of the invention, the fixed-joint coupling means comprise a plurality of slots which are helically arranged on the central support element.

BRIEF DESCRIPTION OF THE DRAWINGS

Further characteristics and advantages of the present invention will become more apparent hereinafter from the following detailed disclosure of a preferred, though not exclusive, embodiment of the invention, which is illustrated, by way of an indicative, but not limitative, example in the accompanying drawings, where:

FIG. 1 is a front elevation view schematically showing the arrangement of a plurality of washing rotary brushes in a motor vehicle washing system;

FIG. 2 is a top plan view of a band element;

FIG. 3 is a perspective view of the band element, shown in a wound or rolled position along a longitudinal axis thereof;

FIG. 7 is a further top plan view of an inclined or slanted axis band element;

FIG. 8 is a further plan view of the band element shown in FIG. 7, folded on the longitudinal axis thereof;

FIG. 9 is a further schematic view showing the application of the band element to a rotary support therefor;

DESCRIPTION OF THE PREFERRED EMBODIMENTS

Figure 4:
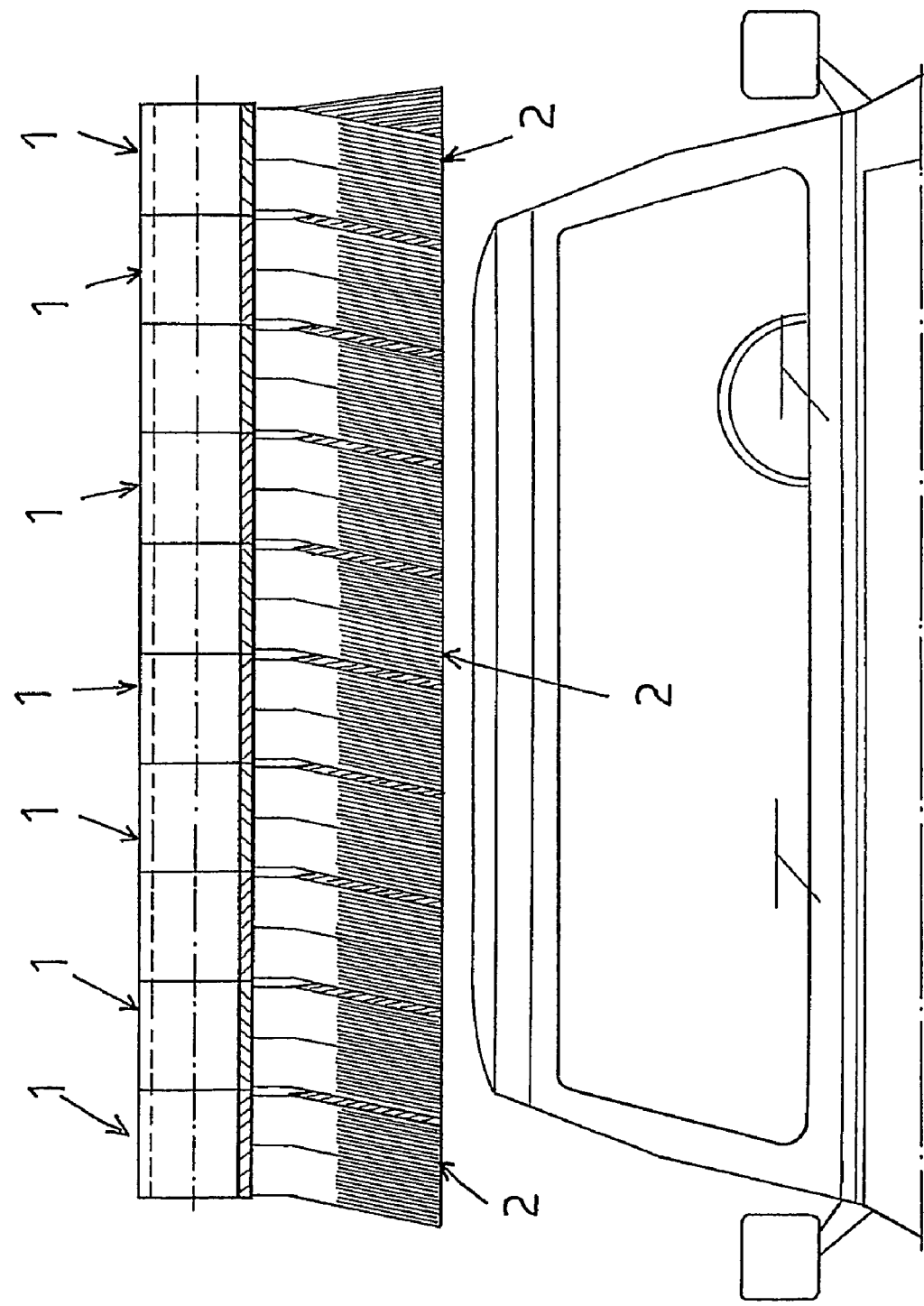
FIG. 4 is a further front elevation view schematically showing the arrangement of a plurality of washing rotary brushes in a motor vehicle washing system, in which the washing brushes comprise slanted-axis band elements.

With reference to the number references of the above mentioned figures, the washing rotary brush according to the invention, which has been generally indicated by the reference number 1, comprises a plurality of band elements, each indicated by the reference number 2, which can be coupled to a central support 3, through coupling means 4.

More specifically, each said band element 2 comprises a plate-like body 5 which can be advantageously made of a closed cell foamed plastic materials or a felt material.

Said plate-like body 5 has a configuration which is substantially elongated along a band element longitudinal axis and, on said plate-like body 5 a plurality of cuts 6 are formed, so as to provide a plurality of parallel strips 7.

A main feature of the invention is that the plate-like body 5 can be folded through 180° about its longitudinal axis to define two sectors which are thereby overlapped onto one another.

The end portions of said plate-like body can be inclined or slanted with a set slanting angle, thereby causing said sectors, as it is clearly shown in FIGS. 7 to 9, to define a plurality of strips 7 which have respectively counter-directed inclinations.

Thus, the provision of the above disclosed brushes 1 allows to provide, the number of the band elements 2 being smaller, the same washing characteristics, since the mutual inclination or slanting of the strips 7 will provide an increase of the useful washing height thereof.

In other words, if a conventional band element 2, of straight-line configuration, has a flat width of 15 cm, as it is folded with respect to its middle longitudinal direction, it will be able of washing a strip having a surface of about 8-9 cm.

For the above disclosed band element 2, the starting width being the same, as it is folded through 180° along a longitudinal direction, because of the mutual inclination, strips 7 will be provided which are adapted to wash through a region having a width from 15 to 20 cm.

Thus, the increase of the useful working or washing surface will allow to use a less number of band elements 2, the washing shaft length being the same, to provide smaller weight brush assemblies, with a consequent power saving, thereby improving the washing evenness, due to the elimination of gaps between adjoining band elements.

After having folded through 180° the band element 2, said band element is further folded about its middle cross axis to be coupled to the central support element 3.

Thus, an assembly is provided, adapted to operate in a more delicate manner on the surfaces to be washed, thereby reducing vibrations and assuring a longer duration of the bearings supporting the washing elements.

It is possible to fold the band element 2 about the middle cross axis, in an asymmetrical manner with respect to the center, thereby providing a plurality of strip elements 7 having a differentiated length.

The connection of the band element 2 to the central support element 3 is performed, according to the present invention, by specifically designed coupling means 4 including an attachment or clamping bar element 8 which is bayonet-like engaged in one of the slots 9 formed along the directrix lines of the central support element 3.

After the engagement, the end portion of the bar element 8 will closely and safely contact the central support element 3, thereby making a safety weldment thereof possible.

In this connection, it should be pointed out that the coupling means according to the present invention allow to provide the connection without the need of using specifically designed coupling tools, while allowing the physical effort to be reduced to a minimum as necessary.

The bar element 8 is designed for holding the band element 2 clamped to the cylinder 3.

As shown, said bar element 8 comprises an enlarged end portion 10, the other end portion of said bar element including a tooth element 11.

The enlarged end portion 10 is engaged in suitable recesses 12, formed in an adjoining relationship with each slot 9 on the support element 3, whereas the tooth 11 can be engaged in a hole 13 formed at the other end portion of each said slot 9.

The tooth 11 is snap engaged herein on an annular rim 14 encompassing the support element 3.

The width of the bar element 8 is so designed as to provide a plurality of equally spaced slots 9.

Figure 19:
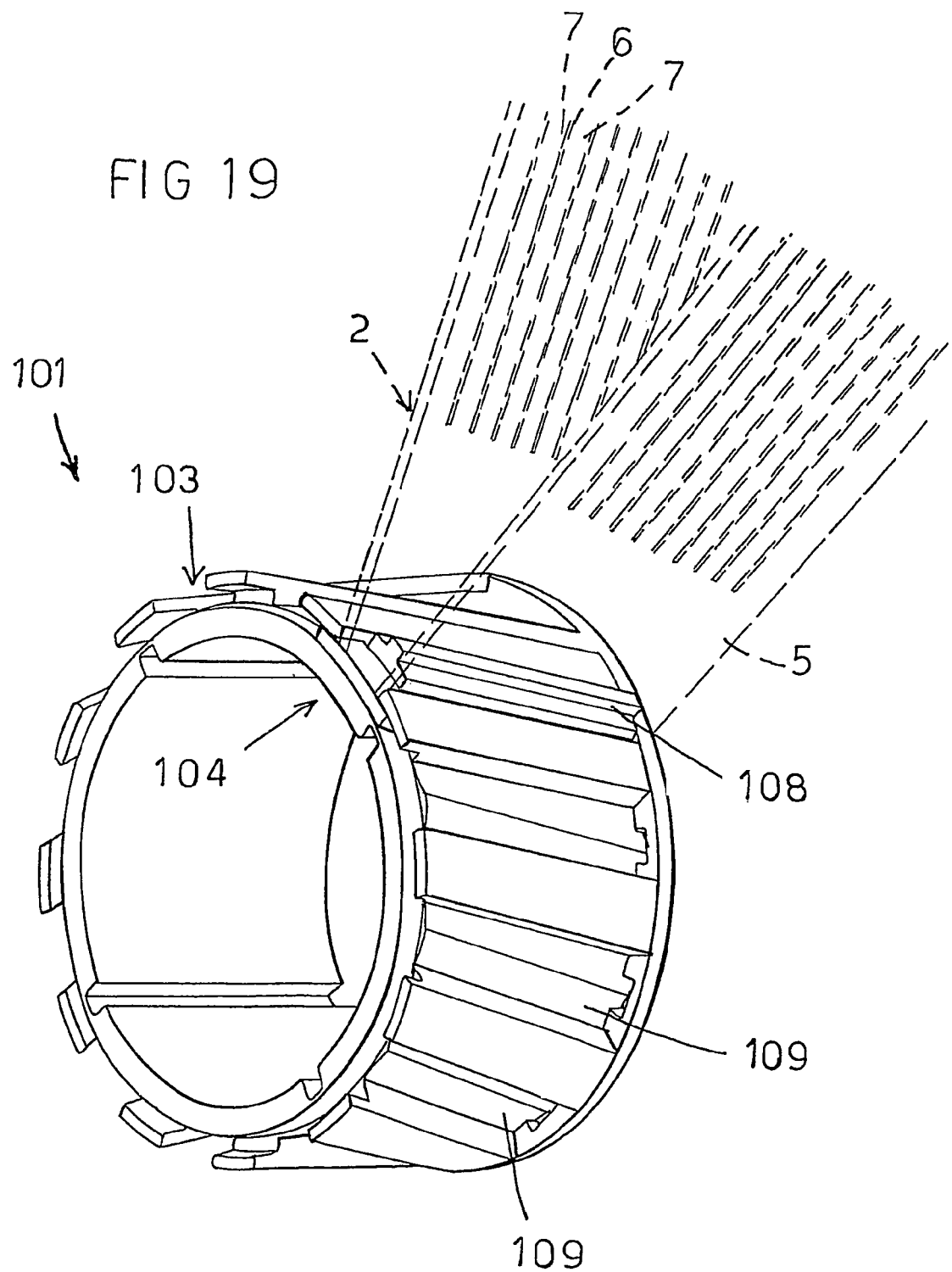
FIG. 19 is a further exploded perspective view showing, in a detailed manner, the application of the band element to the support therefor, according to a further aspect of the present invention.
Figure 20:
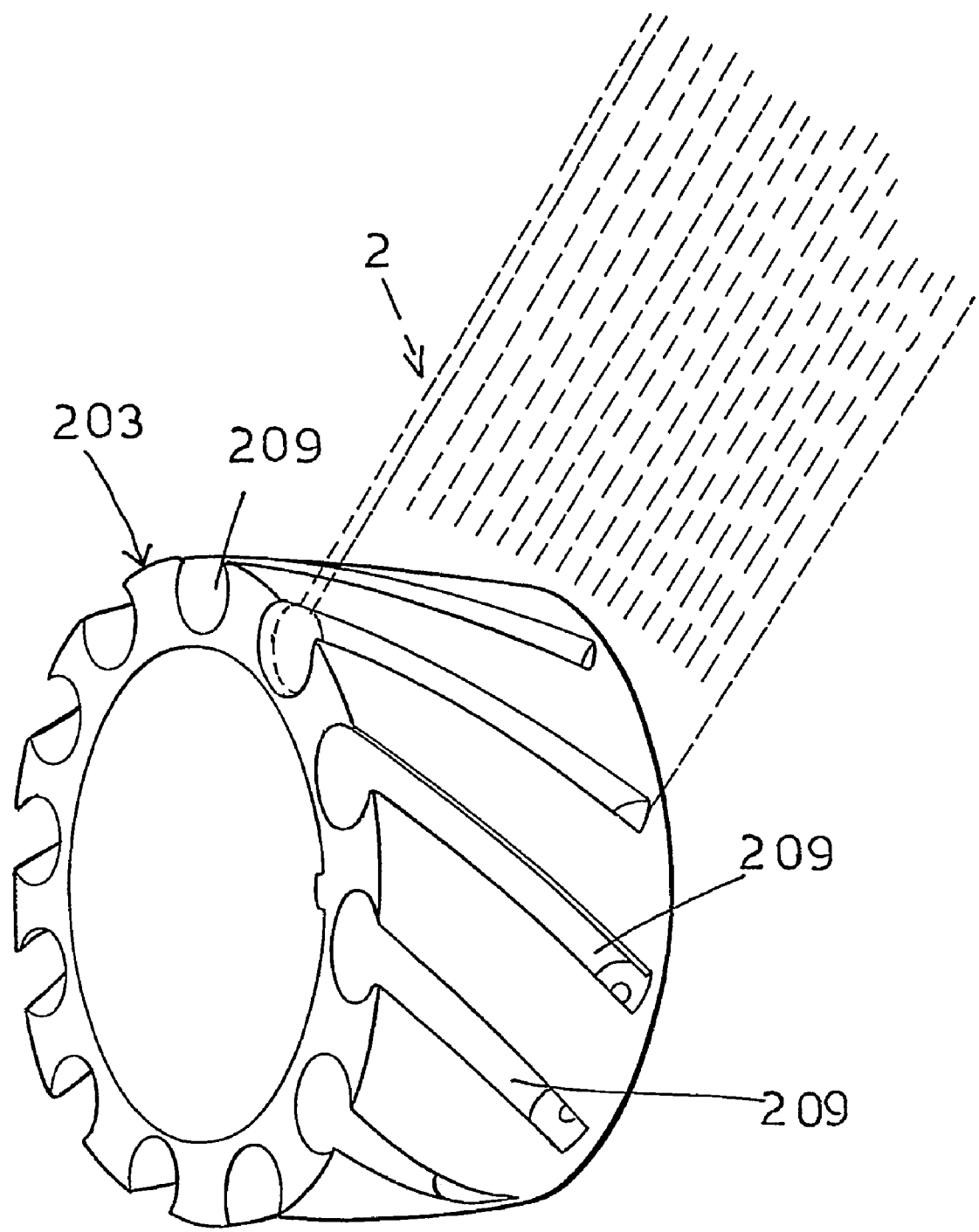
FIG. 20 is a further perspective view showing, in a detailed manner, the application of the band element to the support therefor, according to a further aspect of the present invention.
Figure 21:
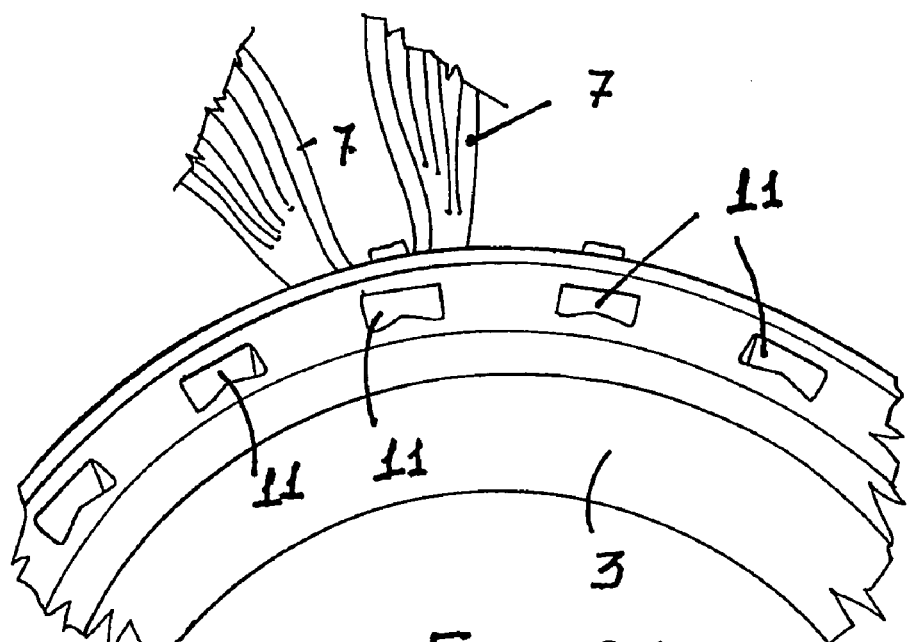
FIG. 21 is a side view showing a washing rotary brush including a plurality of bristle clamping bar elements, as laterally seen and engaged in their housing seats or recesses formed in a support of the central body of the washing rotary bush.
Figure 22:
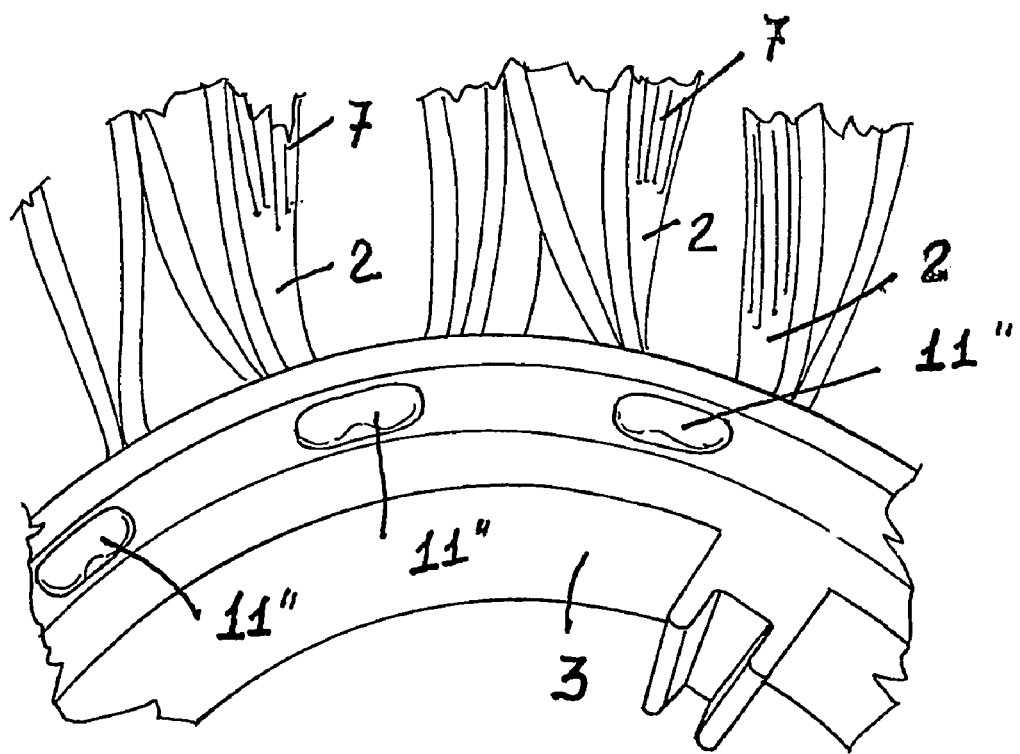
FIG. 22 represents the same view as shown in FIG. 21, but with the clamping or fixing bar elements being engaged in slots formed in the brush central body, after a suitable deformation thereof at one of their side end portions, thereby assuming the configuration of a nail head portion.

FIGS. 19 and 20 show two further embodiments of the washing rotary brush according to the present invention.

With reference to the number references of FIG. 19, the washing rotary brush according to the invention, generally indicated by the reference number 101, comprises a plurality of band elements, each identified by the reference number 2, said band elements being adapted to be coupled to a central support element 103 through coupling means 104.

In particular, the coupling of the band element 2 to the central support 103 is performed, according to the embodiment shown in FIG. 19, by coupling means 104 comprising a clamping bar element 108 adapted to be engaged, in a bayonet-like manner, in one of the slots 109, helically arranged on the surface of the central support element 103.

After having performed this engagement, the end portion of the bar element 108 will closely and safely contact the support element 103, thereby allowing to perform a safety welding operation.

The coupling means according to the present invention permit to perform the coupling without the need of using specifically designed tools, and allow to reduce the physical effort to a minimum, as necessary.

The bar element 108 is provided for holding the band element 2 clamped to the cylinder 103.

In the embodiment shown in FIG. 19, the bar elements 108 are substantially rectilinear, as well as the corresponding slots 109.

Thus, the bar element 108 cannot slip on the band element to be clamped, thereby preventing overheating phenomenon from occurring, which would reduce the production yield.

In the embodiment shown in FIG. 20, the central support element, generally indicated by the reference number 203, comprises helical slots 209 which can be engaged by respective bar elements, not shown, suitably curved so as to prevent any rubbing movement on the respective band element inside the slots 209.

In both the above disclosed embodiments, the width of the bar element 108 is so designed as to provide a plurality of equispaced slots.

The coupling system according to the present invention provides a lot of different advantages.

The system can be handled in a much more easy manner.

In fact, any manual operations for obtaining a set position arrangement is greatly reduced, since the operation of clamping or locking the cleaning element is achieved by a slight or small bayonet sliding (of few millimeters) which can be obtained by a low pressing.

The system is moreover much more reliable.

In fact, upon performing the coupling, the foot portion of the bar element will be engaged in a throughgoing manner and the head will in turn be coupled in an analogous manner.

Differently from prior systems, the coupling means according to the present invention do not allow any rotary or unthreading movement, both in the assembling operation and in the use proper.

The subject system, furthermore, allows to perform very quick and easy welding operations, owing to the projecting end portions contacting the support body.

Moreover, the coupling system according to the present invention can be used in a lot of different applications, for example with foamed materials or felt materials or the like.

It has been found that the invention fully achieves the intended aim and objects.

In fact, the invention provides a washing brush having a better distribution of the washing strings or elements, which, after having folded the band element to a slanted arrangement, will be arranged not in parallel to one another but so as to form a doctor blade proper toward the surface to be contacted.

This provides a better exploiting of the cleaning strings 7 which, if they would be arranged perpendicular to the rotary axis, and accordingly parallel to one another, would tend to "perfectly conceal" one beyond the other, thereby providing an unsatisfactory intensity washing operation (the so called "domino" effect).

The system according to the present invention, moreover, affords the possibility of performing a full closure or filling-in of the spaces left empty by the parallel arrangement which, otherwise, would involve the generation of a plurality of not touched regions.

Moreover, the system according to the present invention allows to perform a much easier assembling while providing good strength characteristics and a long time duration.

Such an optimized distribution will make the washing brush very homogeneous, thereby improving its washing efficiency.

Moreover, the system allows to provide a variable type of geometry, depending on the washing brush diameter to be achieved.

Moreover, the washing brush according to the present invention allows to optimize the operation results, by changing the slanting or inclination of the strings, by few degrees either upward or downward, and this depending on the diameter of the subject washing brush.

Moreover, the inclination of the cuts 6 of the strings 7 defines the distance of the merging point of the end portions.

To a larger inclination of the cut will correspond a nearer merging or meeting point.

Moreover, the system according to the present invention allows to greatly increase the washing force, since the band elements 2 will touch as a doctor blade the surface to be washed.

In other words, since a band element 2 can be spread apart up to nearly double the space of its base, its washing force will be greatly improved.

Moreover, the inclination of the cuts 6 of the strings 7 allows said strings to be better peripherally arranged and allows the strings to better perform.

The amount of band elements 2 being the same, the subject washing brush 1 will be accordingly much more efficient with respect to a washing brush including parallel and perpendicular band elements.

By assembling the sectors starting from either one or the other end portions with diagonal band elements 2 facing the center, it is possible to obtain a vehicle encompassing effect, thereby greatly improving the washing efficiency at the end contact edges.

Figure 5:
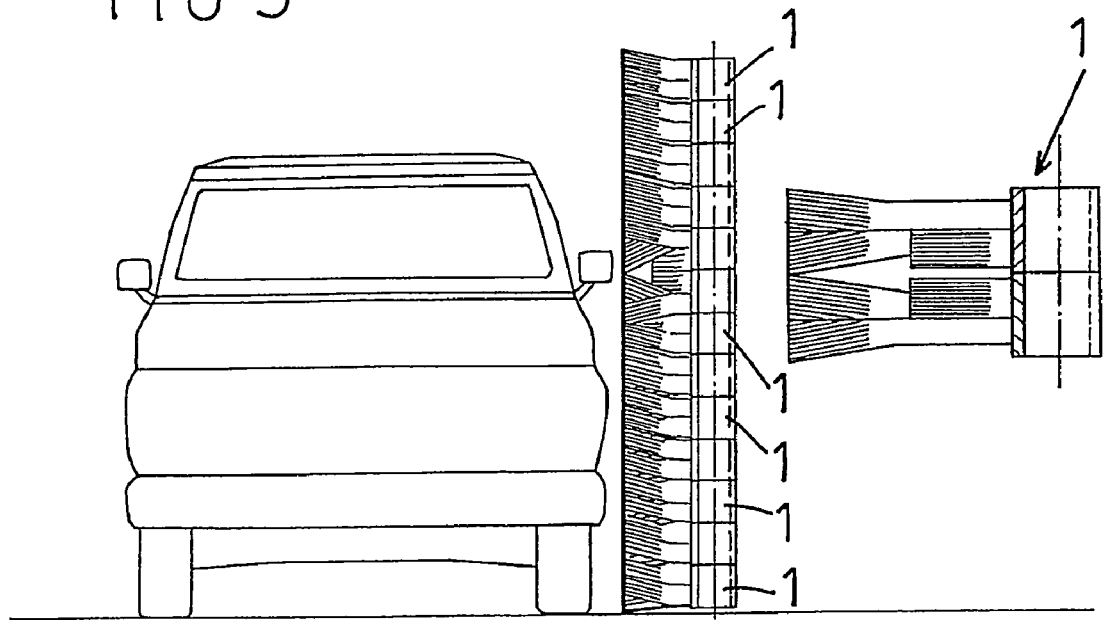
FIG. 5 is a further front elevation view, showing yet another arrangement of a plurality of washing rotary brushes in a motor vehicle washing system, in which the washing brushes comprise a plurality of slanted-axis band elements.
Figure 6:
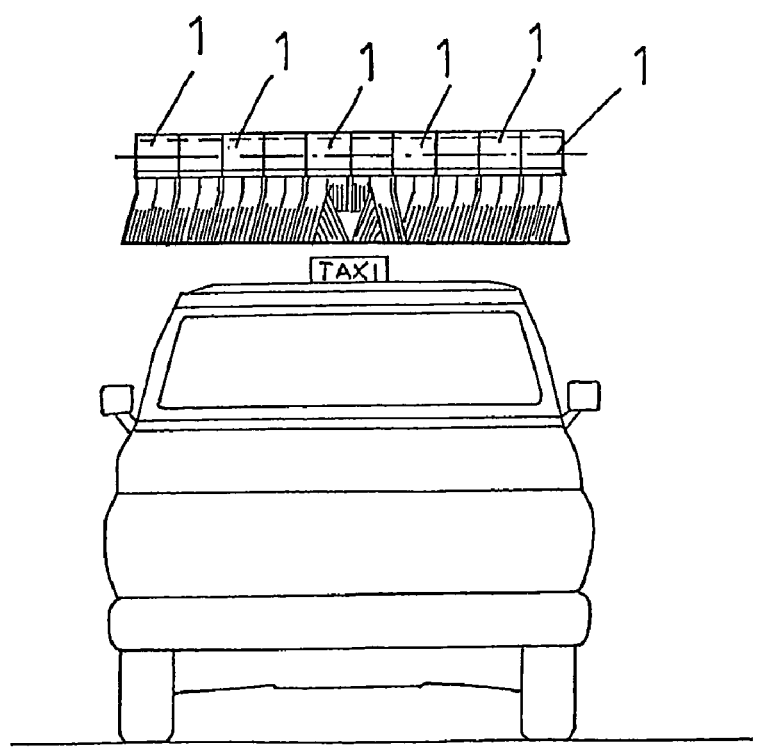
FIG. 6 is a further front elevation view, similar to the preceding views, showing the operation of the washing brushes on a motor vehicle including projecting bodies.
Figure 10:
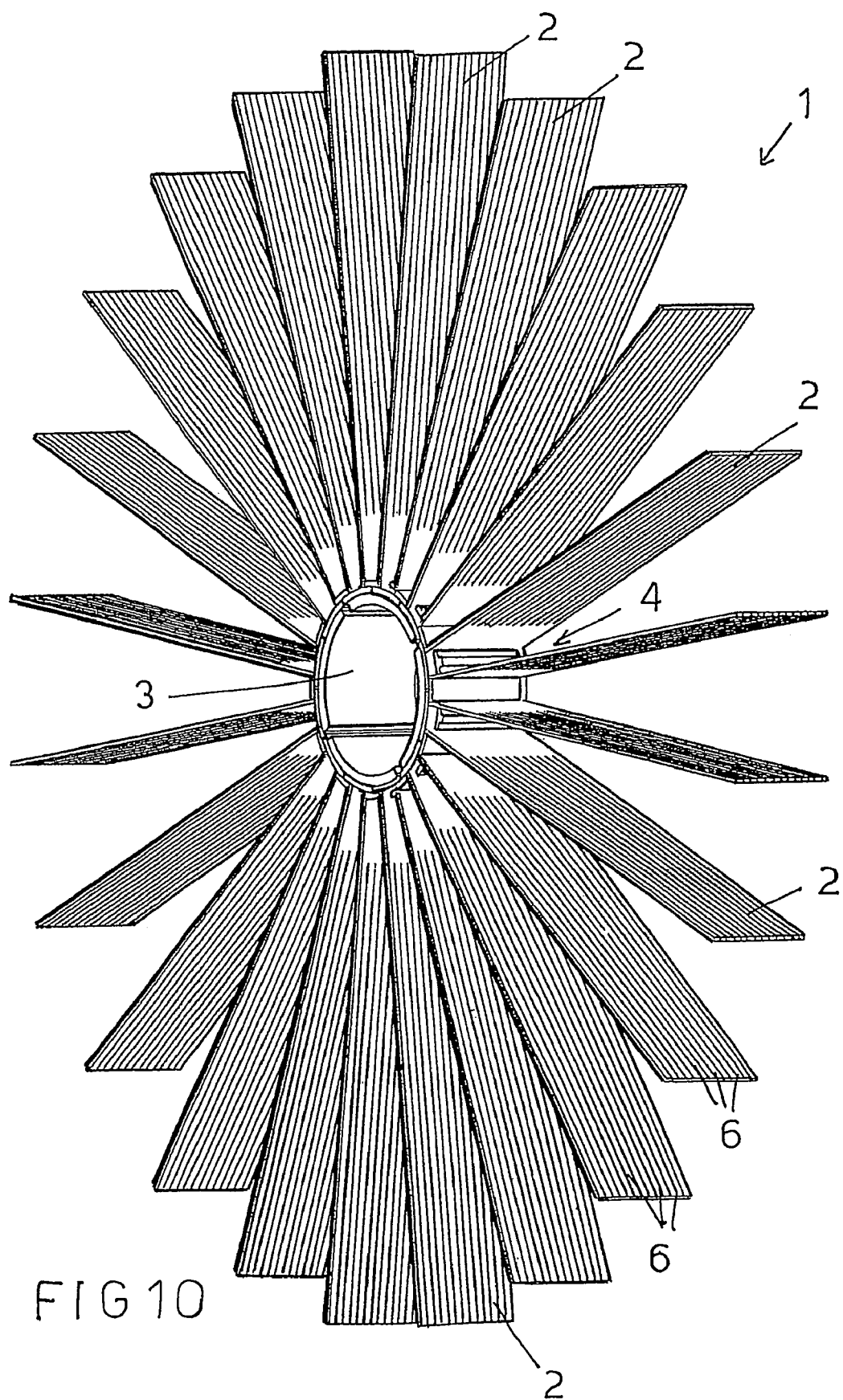
FIG. 10 is a perspective view of a washing rotary brush according to the present invention.
Figure 11:
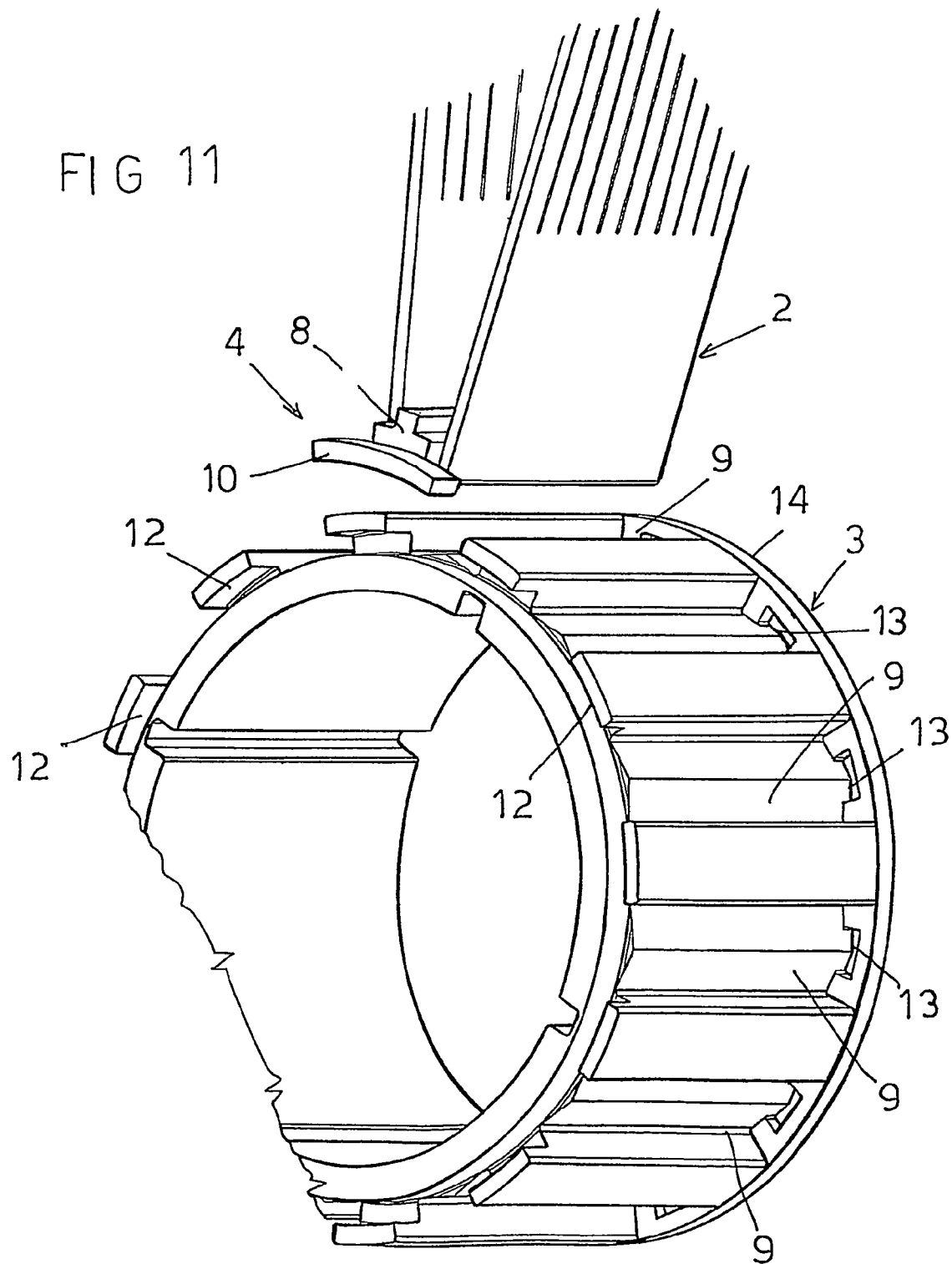
FIG. 11 is a further exploded perspective view showing in a more detailed manner the application of the band element to its supports.
Figure 12:
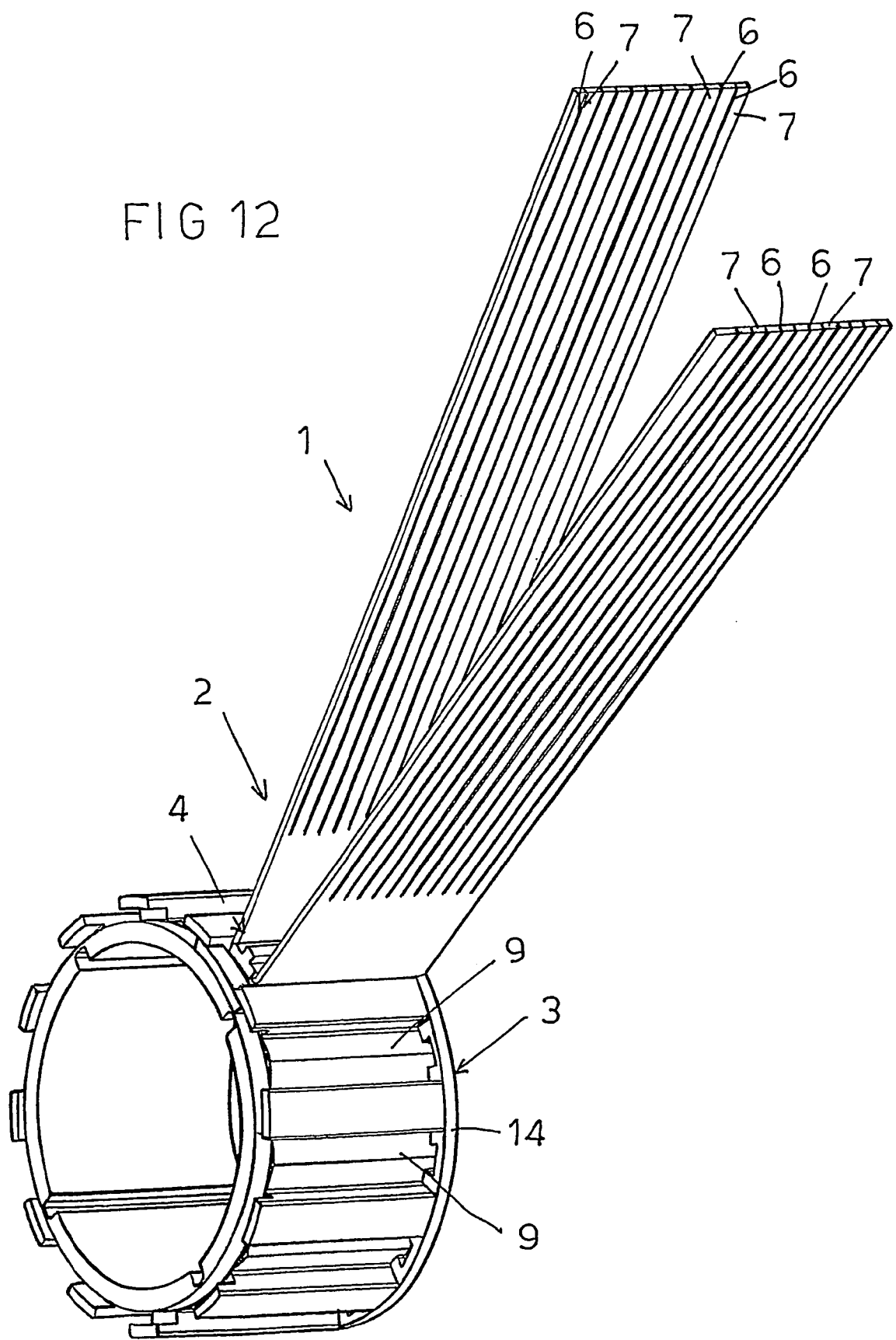
FIG. 12 is a further perspective view showing, in a detailed manner, the application of the band element to the support therefor.
Figure 13:
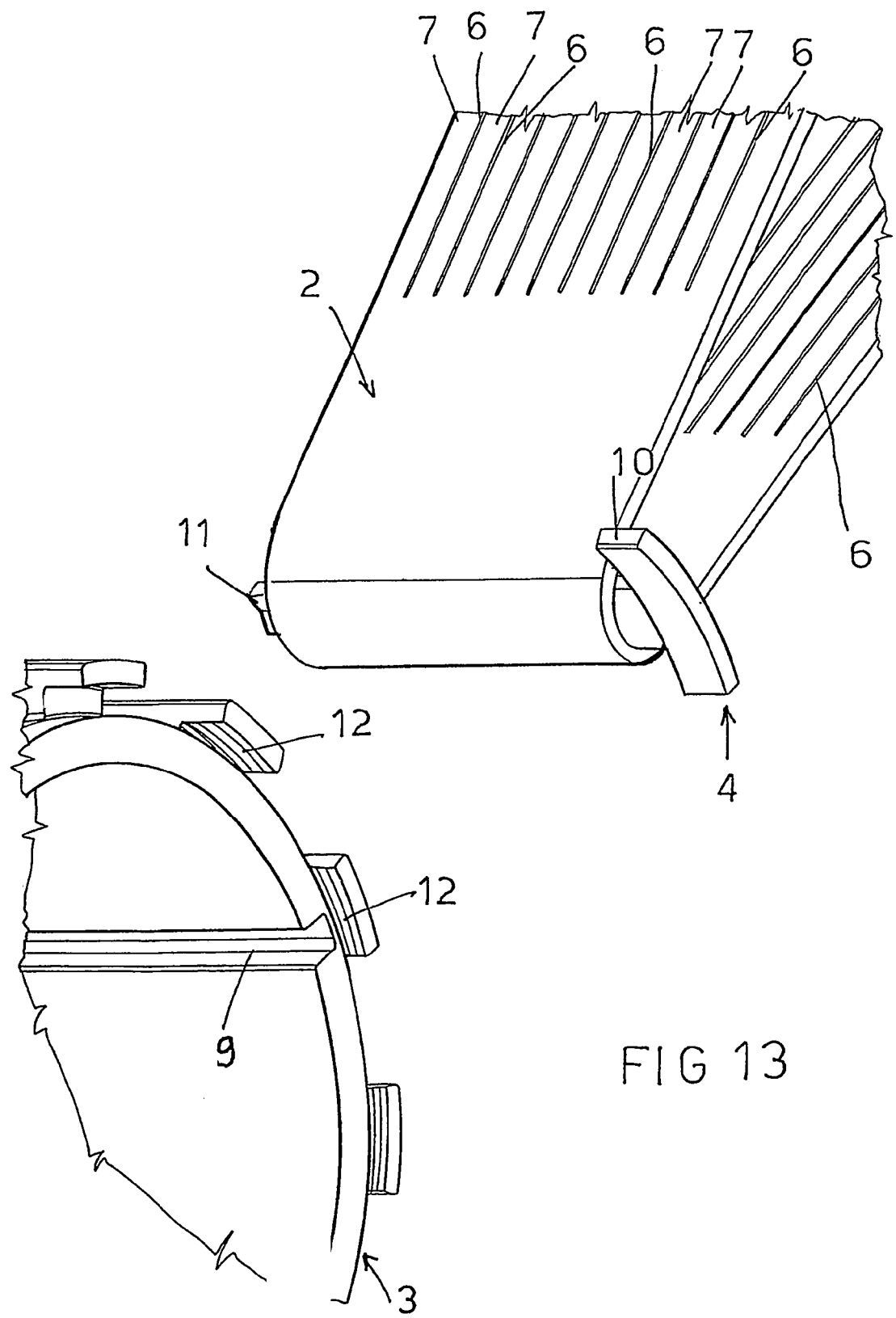
FIG. 13 is a further exploded perspective view, on an enlarged scale with respect to the preceding views, showing in a detailed manner the application of a band element to the support therefor.
Figure 14:
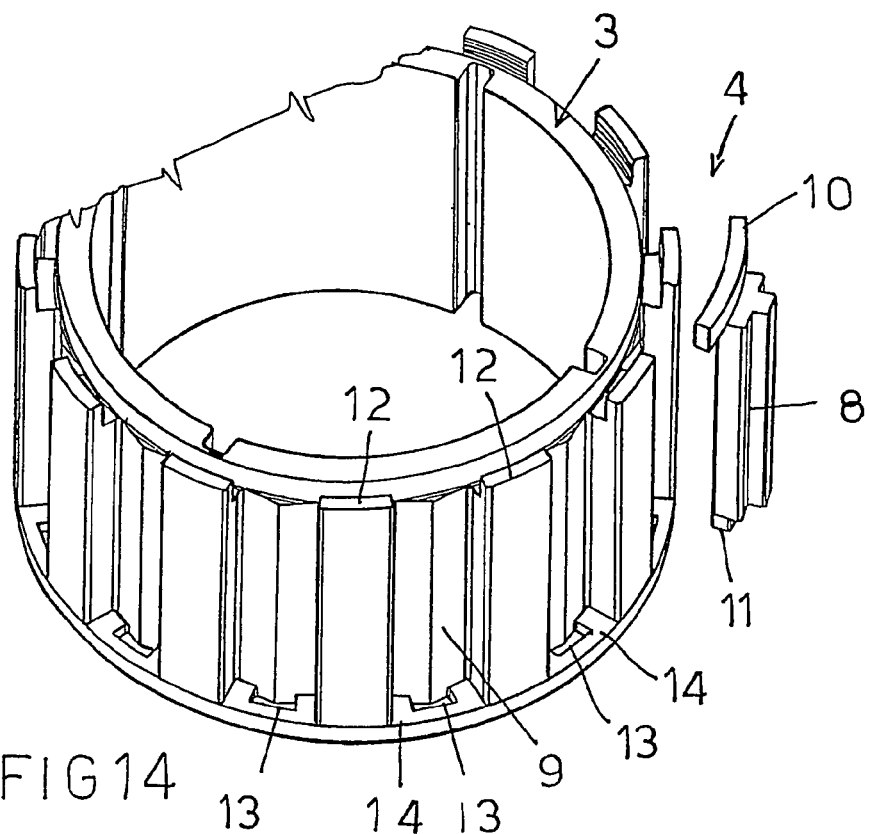
FIG. 14 is a further exploded perspective view showing the support and insert assembly.
Figure 15:
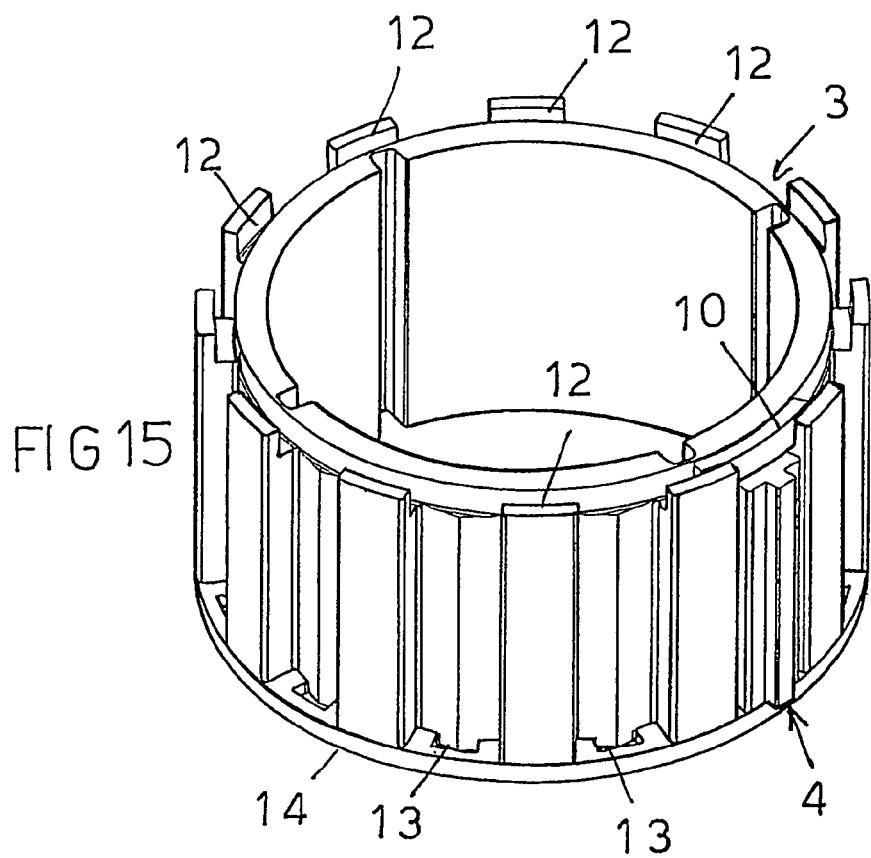
FIG. 15 is a view similar to FIG. 14, showing the insert in an inserted or engaged condition thereof.
Figure 16:
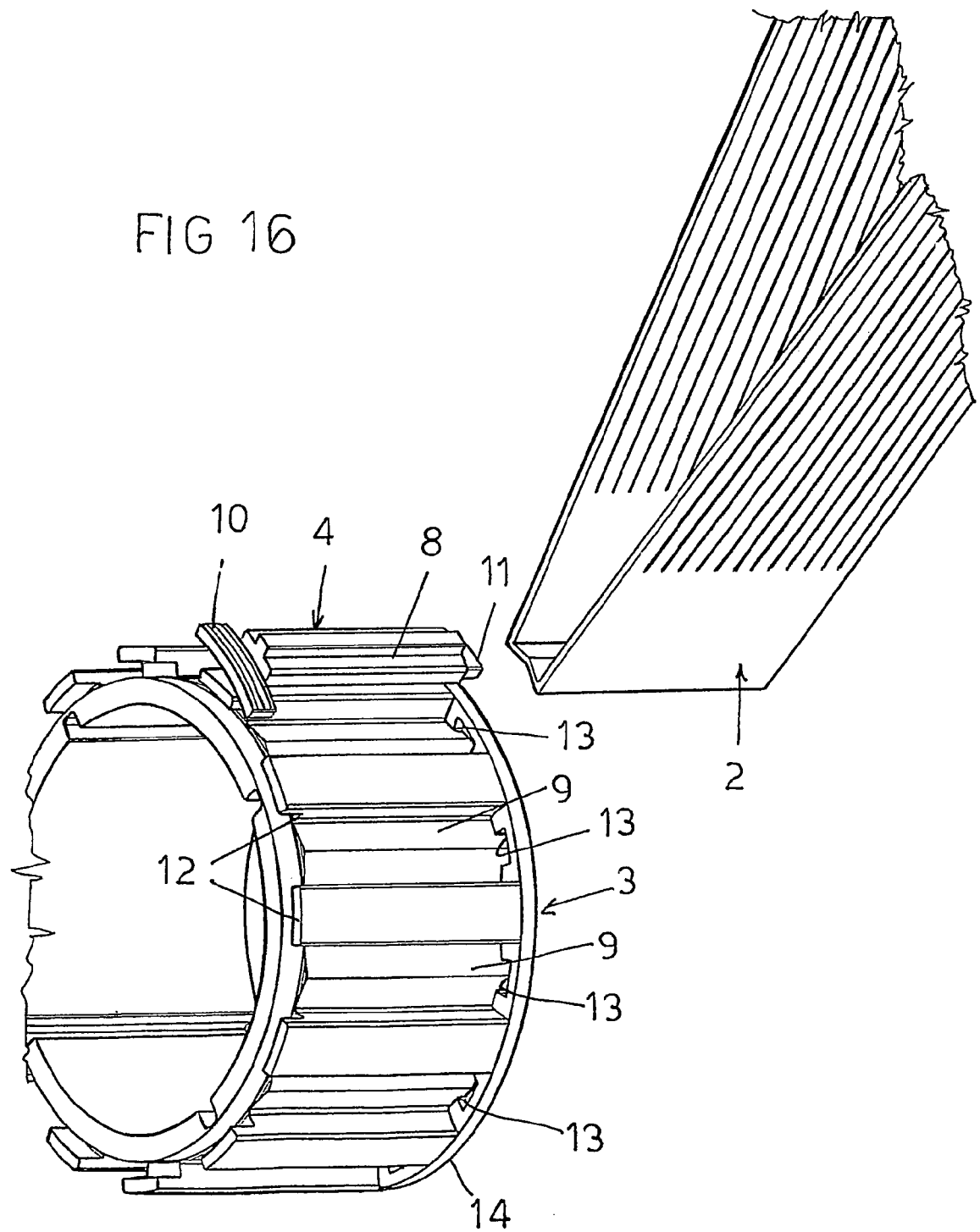
FIG. 16 is an exploded perspective view, showing in a detailed manner the application of a band element to the support therefor.
Figure 17:
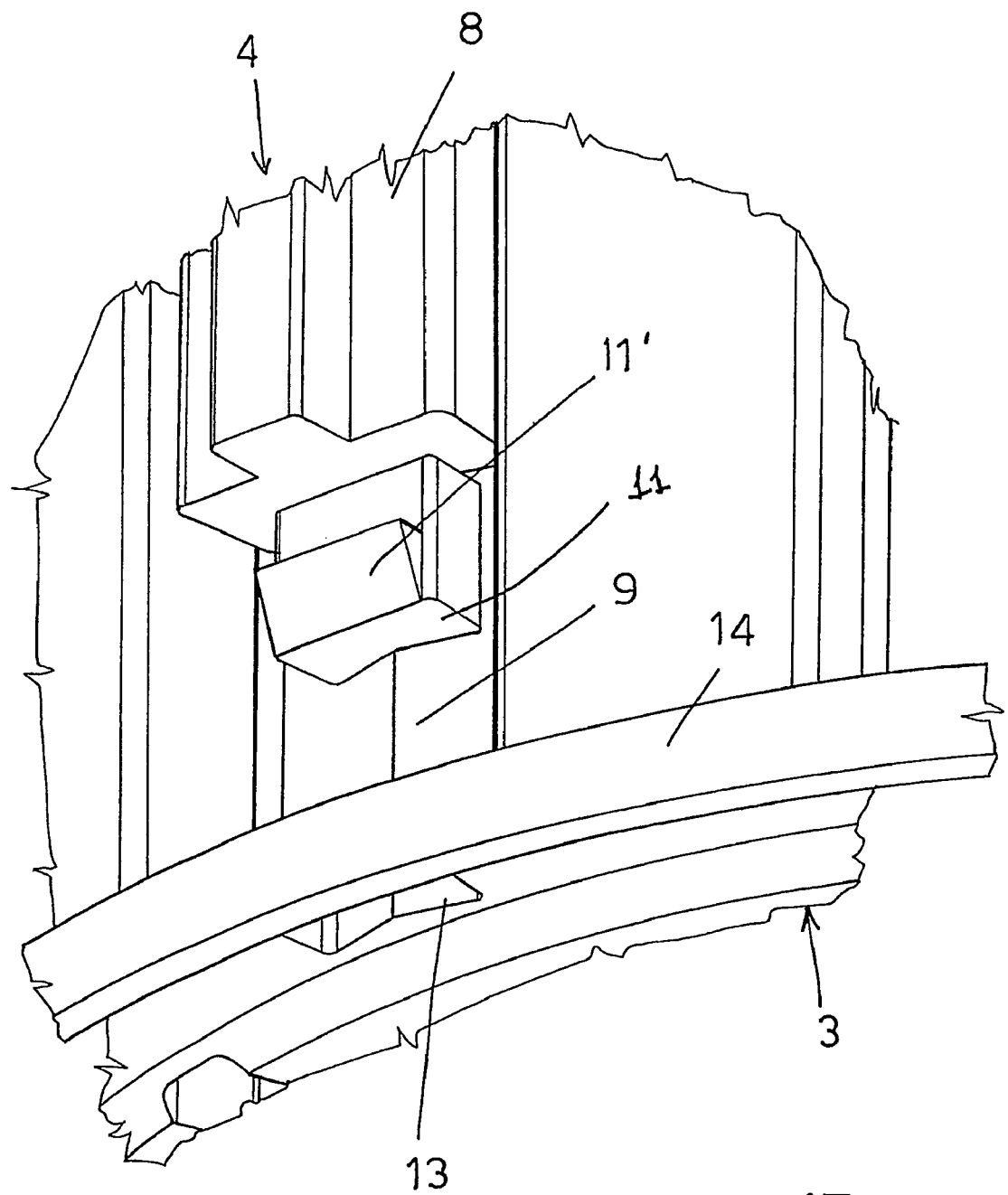
FIG. 17 is a further perspective view, on an enlarged scale, of a detail of the insert and support seat therefor.
Figure 18:
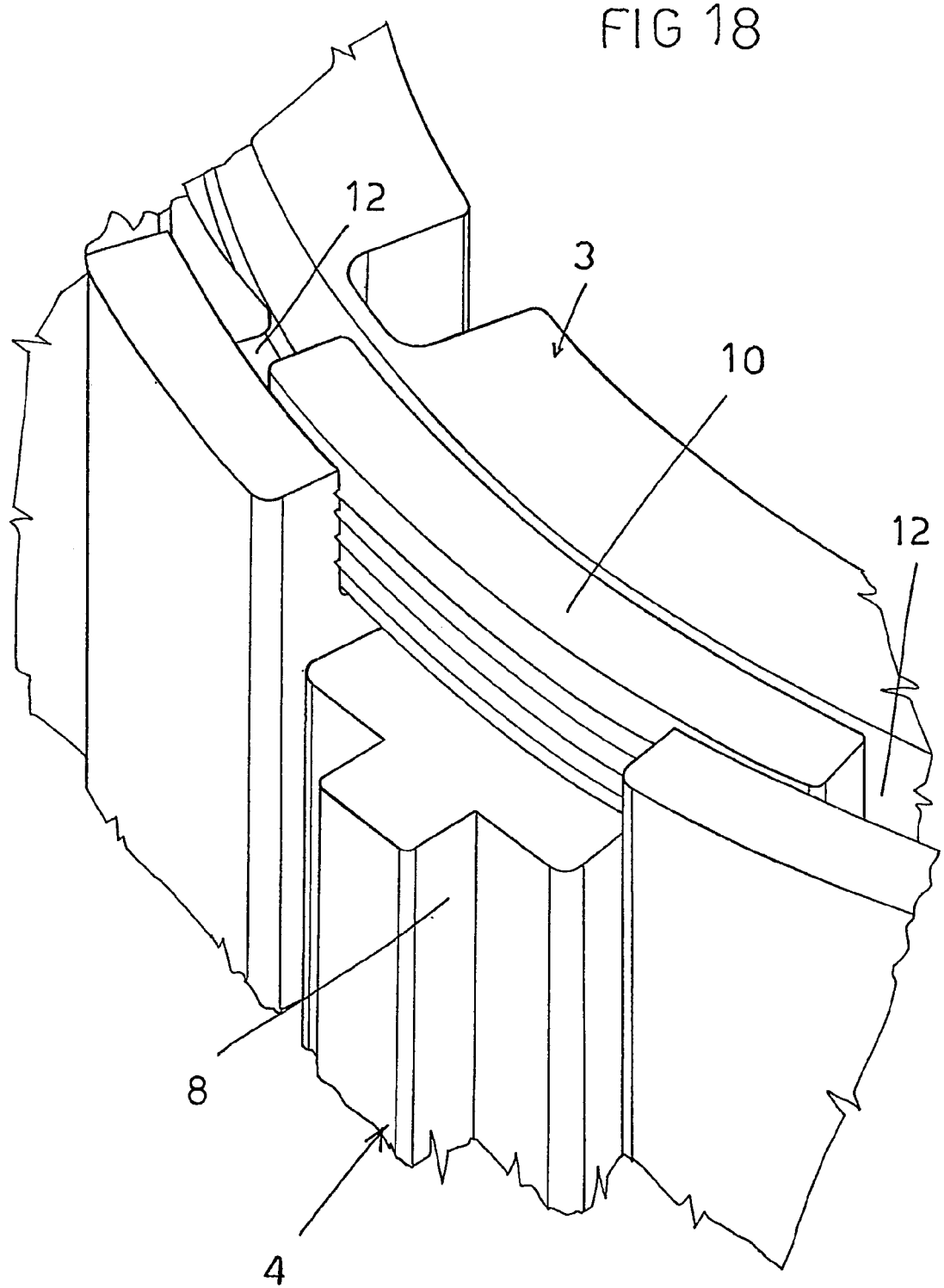
FIG. 18 is a further perspective view, on an enlarged scale, of yet another detail of the insert and support seat or recess therefor.

In this connection, it should be furthermore pointed out that the invention provides to use a specifically cut band element arrangement, to leave an empty region inside the washing brush, like a pouch as is shown in FIGS. 5 and 6; thus, two washing cylinders mounted with an opposite relationship, would be able of properly washing a projecting element, while allowing it to pass through with an arch-like arrangement, such as a rear mirror or a TAXI sign.

In fact, the end portions of the band element 2 will be able of properly contacting the regions near the rear mirror, thereby causing the rear mirror to be encompassed by the mentioned pouch.

This will greatly reduce friction of the projecting object, by the washing brush, as the latter is displaced toward the vehicle to provide its washing action and, accordingly, the subject washing brush can also be used on a central portion of a horizontal surface, for example for preventing any damaging to TAXI signs or police car blinking lamps as well as rear pulling hook assemblies.

A further advantage is that the rotary direction of the vertical washing brush is changed near a rear window to prevent the rear window from being folded down.

In this connection, it should be moreover pointed out that the clamping bar elements 8, 108, engaged with a bayonet-like engagement arrangement in one of the slots 9, 109 formed in the central body 3 of the rotary brush 1, have respective end portions 11 provided for being hot swaged.

In other words, after having located a bar element 8, operating as a locking element for the band 2, in its recess or housing, the tooth 11' provided at one end portion 11 of a said bar element 8 will be arranged under the bridge 13 holding it in a locked condition.

By a suitable instrument, calibrated at a set temperature, the projecting end portion 11 of said bar element 8 is so deformed as to cause said bar element 8 to assume, at its end portion 11, the shape of a nail head 11'.

As stated, the end portion 11 of the bar element 8, 108 can be either swaged or it can be molten with the central crown 3 holding the assembly.

The bar element 108 can be welded to the central body 3, 103 of the brush not only at its end portion 11 but also at other portions of the central support 3, to hold said band element 2 in its engagement slots 9.

It is also possible to restrain the band elements 2 to the central body 3, 103 by a welding operation of a second body, so as to form a sandwich construction, if the used central shaft is constituted by a plastics material tube.

In this connection, it should be moreover pointed out that the invention also provides to use, for foamed material cleaning band elements 2, or felt band elements, conventional polyethylene threads, which can be applied and restrained to the central body 3 of the rotary brush 1 by using the same bar elements as those used for clamping or locking the band element 2.

In summary, the invention has provided according to a first aspect, a washing rotary brush for motor vehicle washing systems, wherein said washing rotary brush comprises a cylindric central support having a cylindric wall, said cylindric wall having a cylindric wall outer surface, to said cylindric wall outer surface being fixedly coupled, by fixed joint coupling means, a plurality of band elements, said fixed-joint coupling means comprising a clamping bar element having a first projecting enlarged end portion engaged in an engagement recess formed adjoining a respective slot of a plurality of slots engraved along directrix lines in said cylindric wall outer surface of said cylindric central support, wherein said clamping bar element further comprises a second end portion including a tooth engageable in a hole formed at an end portion of said slot, on an annular rim encompassing said cylindric central support, wherein, after having being engaged in said slot, said projecting enlarged end portion of said clamping bar element closely and safety contacts and is welded to said cylindric wall outer surface, and wherein said slots are helically arranged on said cylindric central support.

The invention claimed is:

1. A washing rotary brush for motor vehicle washing systems, wherein said washing rotary brush comprises a cylindric central support having a cylindric wall, said cylindric wall having a cylindric wall outer surface, to said cylindric wall outer surface being fixedly coupled, by fixed joint coupling means, a plurality of band elements, said fixed-joint coupling means comprising a clamping bar element having a first projecting enlarged end portion engaged in an engagement recess formed adjoining a respective slot of a plurality of slots arranged along directrix lines in said cylindric wall outer surface of said cylindric central support, wherein said clamping bar element further comprises a second end portion including a tooth engageable in a hole formed at an end portion of said slot, on an annular rim encompassing said cylindric central support, wherein, after having been engaged in said slot, said first projecting enlarged end portion of said clamping bar element closely and safely contacts and is welded to said cylindric wall outer surface, and wherein said slots are helically arranged on said cylindric central support.

2. A washing rotary brush, according to claim 1, wherein said clamping bar elements and slots are rectilinear.

3. A washing rotary brush, according to claim 1, wherein said second end portion of said bar element is deformed by a set temperature calibrated tool to cause said bar element to assume, at its end portion, a nail head shape.

4. A washing rotary brush, according to claim 1, wherein said clamping bar element is a cast clamping bar element.

5. A washing rotary brush, according to claim 1, wherein said cylindric central body is a plastics material tube.

6. A washing rotary brush, according to claim 1, wherein said rotary brush comprises polyethylene wires applied to said cylindric central support by using the same bar elements used for locking said band elements.

7. A washing rotary brush, according to claim 1, wherein each said band element comprises a plate body in which are provided a plurality of cuts defining a plurality of parallel strips, each said plate body having end portions which are so inclined as to provide said strips with counter-directed inclinations.

\* \* \* \* \*